UNITED STATES PATENT OFFICE 2,603,573

BITUMINOUS MIXTURES AND PROCESSES FOR THEIR PREPARATION

John Frederick Thomas Blott, Worcester Park, and Peter Alexander, Surbiton, England, assignors to Shell Development Company, San Francisco, Calif., a corporation of Delaware No Drawing. Application August 26, 1946, Serial No. 693,166. In Great Britain August 23, 1945

9 Claims. (Cl. 106—283)

This invention relates to bituminous mixtures and more particularly it relates to bituminous mixtures having improved mechanical stability and to a process for manufacturing the same.

The use of asphalts and bituminous materials as binders for aggregates is well known. Such mixtures are employed, for example, as road foundations, road surfaces, heavy duty flooring, roofing, etc. One of the major difficulties to be overcome in the preparation of such compositions is the normally unsatisfactory wetting or coating action which unmodified asphalts or bituminous materials have on the aggregate particles, such as sand or crushed stone, if water is present. In order to improve the coating or wetting action of these types of binders it has become normal practice to add an acidic wetting agent to the mixture, especially when the so-called "lime process" is used for the manufacture of the compositions.

In the lime process, the bituminous material is mixed with the aggregate in the presence of hydrated lime and water, an acidic wetting agent such as naphthenic acids being present. While the use of naphthenic acids improves the wetting power of the binder for the aggregate, the resulting mixture has the inherent defect of mechanical weakness, thus allowing disintegration to commence in a relatively short time, or permitting fracture to occur under relatively minor stress or load. Furthermore, even a very substantial increase in the amount of wetting agent does not favorably affect the mechanical stability of the composition.

In other arts, such as in the preparation of wall board comprising an asphaltic material and a cellulosic fibrous substance, the penetration of the asphalt through the fibers has been improved by the addition of certain phenols. However, the use of such phenols for the preparation of products of this nature has no relation to the compositions of the present invention since they are used for entirely different purposes, and the lime process is not employed for their preparation. Furthermore, since they are subjected to entirely different sets of conditions during their use from those encountered by the compositions of the present invention, the two arts bear little relation to each other because of the differences between the problems encountered in each art.

It is an object of the present invention to provide bituminous compositions having improved mechanical stability. It is another object of this invention to provide a novel process for the preparation of improved bituminous compositions. It is a further object of the present invention to provide improvements in the lime process for the preparation of bituminous compositions. Other objects will become evident in the disclosure made hereinafter.

Now, in accordance with the present invention, it has been found that the mechanical stability of bituminous compositions comprising a bituminous material, lime, and an acidic wetting agent is improved by the incorporation therewith of a phenol or mixture of phenols having a boiling point below about 225° C. at atmospheric pressure. Still in accordance with the present invention, it has been found that such compositions may be prepared by an improvement in the lime process, namely by admixing a damp or wet aggregate, such as sand, stone, etc., with lime, an acidic wetting agent (including salts thereof) and a phenol boiling below about 225° C., and subsequently removing at least part of the water from the mixture so formed. This invention is of particular value when using wetting agents of the type which, by themselves, yield mixtures of unimproved or reduced mechanical stability.

The binders useful in the compositions of the present invention include asphaltic bitumens of varying penetrations, either unmodified or cut back with diluents such as petroleum fractions, coal tar distillates or road oils. The diluent may be relatively non-volatile, designed to become a permanent member of the composition or may be of a more volatile nature, such as a light gas oil or kerosene, utilized to reduce the viscosity of the binder during preparation of the composition, but subsequently allowed to volatilize away therefrom.

The amount of binder present in the composition is determined by the characteristics of said binder and purpose for which the composition is intended. Usually the binder will be present in amounts from about 2% to about 50%, based on the weight of the final compositon.

The lime which is used in the present process and compositions is preferably hydrated lime, but may be dehydrated lime such as burnt lime or other forms of calcium oxide. The lime employed is preferably a relatively pure commercial product, but may for certain purposes be added in the form of comminuted limestone, oyster shells, etc. It is still further preferred that the lime be finely pulverized hydrated lime, or that the water present in the mixture be limewater. The proportion of lime present in the composition (calculated as hydrated lime) usually may vary from about 1% to about 5%, based upon the eventually dehydrated composition, and about 2% is usually sufficient for the preparation of satisfactory compositions. Other alkaline earth metal hydroxides may be used in place of lime, such as barium, strontium or lithium hydroxides.

The wetting agents which are most effective in the compositions of the present invention are organic acidic materials such as carboxylic acids, hydroxy acids, sulfonic acids and acid esters of sulfuric acid. Certain of the types of acids enumerated have been found to be more effective than others as wetting agents. When using these more effective wetting agents relatively lower proportions are required to secure adequate wetting of any particular aggregate by the binder under specified conditions of water content and temperature of mixing. It is frequently observed that the most effective wetting agents for use in the present process are also those which yield mixtures of relatively low mechanical stability, and that this defect cannot be remedied by increasing the proportion of the same type of wetting agent. Moreover, it has been found that phenols boiling below about 225° C. themselves may promote wetting in the lime process, but that they are relatively ineffective in this respect compared with agents of the types discussed below as being highly effective wetting agents.

Preferred effective wetting agents include carboxylic acids such as higher saturated fatty acids, including lauric acid, myristic acid, palmitic acid, stearic acid, carnaubic acid; unsaturated higher fatty acids such as oleic acid, linoleic acid and linolenic acid. A particularly effective type of wetting agents for use in the present process are the naphthenic acids, especially the mixtures of naphthenic acids derived from natural sources, such as by extraction of petroleum fractions, coal tar fractions, tall oil, crude rosins, etc.

Another effective group of wetting agents is represented by petroleum sulfonic acids, or individual members or fractions isolated therefrom. The amount of wetting agent to be used in the present process may vary from about 0.02% to about 5%, based on the total composition, but preferably is present in amounts from about 1% to about 10%, based upon the amount of the binder.

The water present during the preparation of the composition usually is that amount of water normally present in the aggregate, such as sand, etc., under the conditions employed. However, additional water may at times be desired for the purpose of lubricating the mixture during compounding or spreading, or to act as a carrier, thus promoting more uniform distribution of the various components. Under normal circumstances the amount of water present during mixing will vary from about 1% to about 20% of the total weight of the aggregate, and usually is about 2% to about 5% by weight.

The aggregates used in the compositions of the present invention include sand, stone, stone dust, gravel, scrap, etc., and usually will be sand or mixtures of sand with stone or gravel of various size. The process of the present invention obviates the necessity for heating or drying the stone for the removal of moisture prior to contacting with the binder and other ingredients. The ratio of aggregate to the other components present in the compositions of the present invention will depend to a large extent upon the purpose for which the composition is intended. Normally, especially where sand is the major aggregate employed, it will be present in amounts from about 30% to about 95% of the total composition after setting, i. e. after substantial removal of water and volatile thinners.

The type of sand used in the compositions of the present invention is not critical, but may have typical screen analyses as follows:

|  | Per cent |
|---|---|
| Passing 200 mesh | 0.1– 8 |
| Passing 100 mesh, retained by 200 mesh | 3.0–15 |
| Passing 85 mesh, retained by 100 mesh | 5.0–10 |
| Passing 52 mesh, retained by 85 mesh | 15.0–65 |
| Passing 36 mesh, retained by 52 mesh | 20.0–55 |
| Passing 25 mesh, retained by 36 mesh | 5.0–15 |
| Passing 18 mesh, retained by 25 mesh | 1.0– 5 |
| Passing 10 mesh, retained by 18 mesh | 0.1– 2 |
| Retained by 10 mesh | .0– 1 |

As stated hereinbefore one phase of the present invention comprises adding a phenol having a boiling point below about 225° C. to the mixture comprising aggregate, water, lime and a wetting agent, and thereby obtaining compositions of improved mechanical stability. A single phenol or a mixture of phenols may be used. Various types of phenols may be employed, always provided that they boil below about 225° C. These include carbolic acid, ortho-, meta- or para-monochlorophenol, 2,3-dichlorophenol, 2,4-dichlorophenol, 2,5-dichlorophenol, 2,6-dichlorophenol, ortho-cresol, meta-cresol, para-cresol, 2,3-xylenol, 3,4-xylenol, 2,6-xylenol, 2,4-xylenol, 3,5-xylenol, 2,5-xylenol, ortho-amoxyphenol, meta-amoxyphenol, ortho-bromophenol, para-ethylphenol, ortho-isopropylphenol and ortho-propylphenol. Mixtures of crude cresylic acids, such as those obtained from coal tar, are especially suitable for use in the process and compositions of the present invention. In order to obtain the maximum improvement to be gained by use of the present invention, the phenols should be present in amounts from about 0.01% to about 10% based on the weight of the composition after evaporation of water and volatile diluents, and preferably is present in amounts from about 0.5% to about 20% by weight of the binder.

The preferred process of the present invention comprises mixing wet sand (or other aggregate) with lime, a bituminous binder, an acidic wetting agent and a phenol having a boiling point below about 225° C., compacting, such as by rolling, and allowing the compacted mixture to stand until the water and any volatile diluents have substantially evaporated.

The various ingredients may be added to the wet sand separately or in any order, or the wetting agent may be previously incorporated in the bituminous binder and this mixture with the remaining ingredients may be added in any order. Alternatively, both the wetting agent and the phenols boiling below about 225° C. may be incorporated in the binder and this mixture added to the wet sand either before or after the lime. Preferably, the mixture prepared by incorporating the wetting agent and the phenols boiling below about 225° C. in the binder should not be mixed with the lime before the addition of wet sand.

The compositions of the present invention have superior mechanical stability in comparison with other similar compositions not containing the specified lower boiling phenols. The reason for this is obscure, but it is evident as shown by the data given hereinbelow in Examples I and II that the mechanical stability increases with the proportion the lower boiling phenols combined with the other necessary ingredients.

It has been determined that this is not a simple case of adding more wetting agent, since, if greater mechanical stability were gained by increasing the amount of wetting agent, the lower boiling phenols would be of no advantage. However, when using naphthenic acids, for example as the wetting agent and omitting the lower boiling phenols, no increase in mechanical stability was obtained by increasing the amount of wetting agent from 4% to as high as 32% based on the weight of the binder.

The following examples are presented to illustrate the process of the present invention and to describe the products obtained thereby.

EXAMPLE I

Compositions having the proportions of ingredients given in Table I, below, were prepared by mixing the water with the sand, adding the lime and then adding thereto a warmed mixture of the binder containing the wetting agent and lower boiling phenol. When the composition was uniformly mixed it was compacted by rolling and allowed to stand 7 days before testing.

The test for mechanical stability consisted of measuring the extent of penetration of a roughened 60° steel cone into the material under a load of two kilograms, applied for a 30 minute period. For the purpose of comparison, the mechanical stability is expressed as "bearing value," said value being equal to $L/\pi p^2$, where L is the total load on the cone, and $p$ is the extent of penetration. This value is expressed as $kg./cm.^2$.

The sand used for the comparison had the following screen analysis:

| | Per Cent |
|---|---|
| Passing 200 mesh screen | 6.0 |
| Passing 100 mesh screen, retained by 200 mesh | 10.0 |
| Passing 85 mesh screen, retained by 100 mesh | 9.5 |
| Passing 52 mesh screen, retained by 85 mesh | 17.5 |
| Passing 36 mesh screen, retained by 52 mesh | 35.5 |
| Passing 25 mesh screen, retained by 36 mesh | 14.5 |
| Passing 18 mesh screen, retained by 25 mesh | 5.0 |
| Passing 10 mesh screen, retained by 18 mesh | 1.5 |
| Retained by 10 mesh | 0.5 |

The binder employed was a heavy fuel oil of 180° Engler viscosity. A mixture of petroleum naphthenic acids was used as a binder 4% acids based on the weight of the binder, being employed. A mixture of cresylic acids boiling below about 225° C. were the lower boiling phenols employed. All ratios of components are given as parts by weight unless otherwise specified.

Table I

| Sample | Sand | Water | Hydrated Lime | Binder+ Naphthenic Acids+ Cresylic Acids | Cresylic Acid, Percent of Binder | Bearing Value |
|---|---|---|---|---|---|---|
| | | | | | | $kg./cm.^2$ |
| A | 200 | 10 | 4 | 10 | 0 | 3.2 |
| B | 200 | 10 | 4 | 10 | 1 | 3.5 |
| C | 200 | 10 | 4 | 10 | 2 | 3.8 |
| D | 200 | 10 | 4 | 10 | 3 | 4.4 |
| E | 200 | 10 | 4 | 10 | 4 | 4.6 |
| F | 200 | 10 | 4 | 10 | 5 | 5.2 |
| G | 200 | 10 | 4 | 10 | 6 | 5.4 |

EXAMPLE II

The procedure described in Example I was repeated, except that a mixture of xylenols boiling below about 225° C. was substituted for the mixture of cresylic acids. The bearing values of the compositions were as follows:

Table II

| Sample | Sand | Water | Hydrated Lime | Binder+ Naphthenic Acids+ Xylenols | Xylenols, Percent by Weight of Binder | Bearing Value |
|---|---|---|---|---|---|---|
| | | | | | | $kg./cm.^2$ |
| J | 200 | 10 | 4 | 10 | 0 | 3.2 |
| K | 200 | 10 | 4 | 10 | 3 | 4.7 |
| L | 200 | 10 | 4 | 10 | 6 | 7.6 |

EXAMPLE III

Compositions were prepared having the proportions of ingredients in Table III.

Table III

| Sample | Sand | Water | Hydrated Lime | Binder+ Naphthenic Acids | Naphthenic Acids, Percent of Binder | Bearing Value |
|---|---|---|---|---|---|---|
| | | | | | | $kg./cm.^2$ |
| M | 200 | 20 | 4 | 10 | 4 | 2.6 |
| N | 200 | 20 | 4 | 10 | 7 | 2.3 |
| O | 200 | 20 | 4 | 10 | 10 | 2.1 |
| P | 200 | 20 | 4 | 10 | 15 | 1.6 |
| Q | 200 | 20 | 4 | 10 | 20 | 1.9 |
| R | 200 | 20 | 4 | 10 | 25 | 1.7 |

The sand in these compositions had the following screen analysis:

| | Per Cent |
|---|---|
| Passing 200 mesh screen | 2.3 |
| Passing 100 mesh screen, retained by 200 mesh | 12.7 |
| Passing 85 mesh screen, retained by 100 mesh | 11.5 |
| Passing 52 mesh screen, retained by 85 mesh | 41.0 |
| Passing 36 mesh screen, retained by 52 mesh | 24.0 |
| Passing 25 mesh screen, retained by 36 mesh | 7.0 |
| Passing 18 mesh screen, retained by 25 mesh | 1.5 |
| | 100.0 |

The binder used in these compositions was an asphaltic bitumen of 120/140 penetration at 25° C. cut back with kerosene to a viscosity of 40/50 sec. on Standard Tar Viscosimeter (originally designated "Modified Redwood Tar Viscosimeter").

Table III shows that high bearing values cannot be obtained by increasing the proportion of naphthenic acids present.

EXAMPLE IV

Compositions were prepared as shown in Table IV with the same sand and the same binder as in Example III, but with the addition of various quantities of cresylic acids.

Table IV

| Sample | Sand | Water | Hydrated Lime | Binder + naphthenic acids + cresylic acids | Naphthenic acids percent of binder | Cresylic acids percent of binder | Bearing value |
|---|---|---|---|---|---|---|---|
| | | | | | | | $kg./cm^2$ |
| S | 200 | 20 | 4 | 10 | 4 | 0 | 2.6 |
| T | 200 | 20 | 4 | 10 | 4 | 3 | 2.9 |
| U | 200 | 20 | 4 | 10 | 4 | 6 | 2.8 |
| V | 200 | 20 | 4 | 10 | 4 | 11 | 4.0 |
| W | 200 | 20 | 4 | 10 | 4 | 16 | 6.1 |
| X | 200 | 20 | 4 | 10 | 4 | 21 | 9.2 |

From Table IV it will be seen that the addition of cresylic acids serves to increase the bearing value developed by the mixture.

We claim as our invention:

1. A bituminous composition consisting essentially of:

| | Percent by weight |
|---|---|
| Bituminous binder | 2-50 |
| Hydrated lime | 1-5 |
| Acidic organic wetting agent | 0.02-5 |
| Phenols boiling below 225° C | 0.01-10 |
| Aggregate | 30-95 |

2. A bituminous composition comprising:

| | Percent by weight |
|---|---|
| Bituminous binder | 2-50 |
| Hydrated lime | 1-5 |
| Acidic organic wetting agent | 0.02-5 |
| Phenols boiling below 225° C | 0.01-10 |
| Aggregate | 30-95 |

3. A method of coating and bonding damp mineral aggregate which comprises adding thereto lime, an organic carboxylic acid wetting agent, a phenol boiling below 225° C. and a bituminous binder, and allowing water to evaporate therefrom, the resulting composition consisting essentially of the proportions of ingredients according to claim 1.

4. A bituminous composition consisting essentially of:

| | Per cent by weight |
|---|---|
| Bituminous binder | 2-50 |
| Lime, calculated as hydrated lime | 1-5 |
| A carboxylic acid wetting agent | 0.02-5 |
| Phenols boiling below 225° C | 0.01-10 |
| Aggregate | 30-95 | the above ingredients being in a chemical state resulting from their admixture substantially near room temperature.

5. A bituminous composition consisting essentially of:

| | Percent by weight |
|---|---|
| Asphalt binder | 2-50 |
| Lime, calculated as hydrated lime | 1-5 |
| Naphthenic acids | 0.02-5 |
| Cresols boiling below 225° C | 0.01-10 |
| Mineral aggregate | 30-95 |

6. A bituminous composition consisting essentially of:

| | Parts by weight |
|---|---|
| Asphalt binder | 9.0-9.5 |
| Lime | 4 |
| Naphthenic acids | 0.4 |
| Cresols boiling below 225° C | 0.1-0.6 |
| Sand | 200 |

7. A bituminous composition comprising:

| | Percent by weight |
|---|---|
| Asphaltic binder | 2-50 |
| Lime, calculated as hydrated lime | 1-5 |
| A carboxylic acidic wetting agent | 0.02-5 |
| Xylenols boiling below 225° C | 0.01-10 |
| Mineral aggregate | 30-95 |

8. A bituminous composition comprising:

| | Percent by weight |
|---|---|
| Asphaltic binder | 2-50 |
| Lime, calculated as hydrated lime | 1-5 |
| Higher fatty acids | 0.02-5 |
| Phenols boiling below 225° C | 0.01-10 |
| Mineral aggregate | 30-95 |

9. A bituminous composition comprising:

| | Percent by weight |
|---|---|
| Asphaltic binder | 2-50 |
| Lime, calculated as hydrated lime | 1-5 |
| Petroleum sulfonic acids | 0.02-5 |
| Phenols boiling below 225° C | 0.01-10 |
| Mineral aggregate | 30-95 |

JOHN FREDERICK THOMAS BLOTT.
PETER ALEXANDER.

REFERENCES CITED

The following references are of record in the file of this patent:

UNITED STATES PATENTS

| Number | Name | Date |
|---|---|---|
| 2,332,260 | Roediger | Oct. 19, 1943 |

FOREIGN PATENTS

| Number | Country | Date |
|---|---|---|
| 421,113 | Great Britain | Dec. 6, 1934 |